(12) United States Patent
Yang et al.

(10) Patent No.: US 6,868,824 B2
(45) Date of Patent: Mar. 22, 2005

(54) SYSTEM AND METHOD OF GAS RECIRCULATION IN AN INTERNAL COMBUSTION ENGINE

(75) Inventors: Zhou Yang, South Windsor, CT (US); Robb Janak, Somers, CT (US); Neil Fuchs, New Hartford, CT (US)

(73) Assignee: Diesel Engine Retarders, Inc., Christiana, DE (US)

( * ) Notice: Subject to any disclaimer, the term of this patent is extended or adjusted under 35 U.S.C. 154(b) by 1 day.

(21) Appl. No.: 10/458,257

(22) Filed: Jun. 11, 2003

(65) Prior Publication Data

US 2003/0226540 A1 Dec. 11, 2003

Related U.S. Application Data

(63) Continuation-in-part of application No. 09/822,203, filed on Apr. 2, 2001, now Pat. No. 6,584,954.
(60) Provisional application No. 60/193,366, filed on Mar. 31, 2000.

(51) Int. Cl.[7] .......................... F02M 25/07; F02D 13/04
(52) U.S. Cl. .................. 123/321; 123/568.12; 60/605.2
(58) Field of Search .............................. 123/58, 568.11, 123/568.12, 568.13, 568.14, 568.16, 568.17, 568.18, 568.19, 568.2, 321, 322, 323, 58.8; 60/605.2

(56) References Cited

U.S. PATENT DOCUMENTS

| | | | |
|---|---|---|---|
| 5,146,890 A | * | 9/1992 | Gobert et al. ................ 123/321 |
| 6,328,003 B1 | * | 12/2001 | Gaertner et al. ........ 123/568.12 |
| 6,584,954 B2 | * | 7/2003 | Janak et al. ................. 123/321 |
| 2003/0178002 A1 | * | 9/2003 | Israel et al. ................. 123/321 |

* cited by examiner

Primary Examiner—Willis R. Wolfe, Jr.
(74) Attorney, Agent, or Firm—Collier Shannon Scott PLLC (57) ABSTRACT

A gas recirculation system is disclosed for improving engine braking in an internal combustion engine having an intake valve, an exhaust valve, and a cylinder. The system includes an exhaust manifold operatively connected to the cylinder through the exhaust valve; an intake manifold operatively connected to the cylinder through the intake valve; and a gas recirculation passage adapted to recirculate gas from the exhaust manifold to the intake manifold during an engine braking event.

23 Claims, 10 Drawing Sheets

SYSTEM AND METHOD OF GAS RECIRCULATION IN AN INTERNAL COMBUSTION ENGINE

CROSS-REFERENCE TO RELATED APPLICATIONS

This application is a continuation-in-part of copending U.S. patent application Ser. No. 09/822,203, filed on Apr. 2, 2001, now U.S. Pat. No. 6,584,954, which relates to and claims priority on U.S. Provisional Application No. 60/193,366, filed Mar. 31, 2000 and entitled "Use of External Exhaust Gas Recirculation ("EGR") to Improve Compression Release Braking and Method For EGR Valve and System Cleaning," copies of which are incorporated herein by reference in their entirety.

FIELD OF THE INVENTION

The present invention relates generally to gas recirculation in internal combustion engines. In particular, the present invention relates to a system and method for providing gas recirculation to improve engine braking performance, to assist in cleaning the exhaust gas recirculation ("EGR") system, and to provide normal EGR operation.

BACKGROUND OF THE INVENTION

Flow control of gas through an internal combustion engine has been used in order to provide vehicle engine braking. Generally, engine braking systems may control the flow of gas to incorporate the principles of compression-release type engine braking, exhaust gas recirculation, exhaust pressure regulation, and/or bleeder type engine braking.

The operation of compression release-type engine braking or retarder systems is well-known in the art. A compression release engine brake decreases the kinetic energy of an engine by opposing the upward motion of the engine's pistons on the compression stroke. As a piston travels upward on its compression upstroke, the gases that are trapped in the cylinder are compressed. The compressed gases oppose the upward motion of the piston. During engine braking operation, as the piston nears the top of its stroke, an exhaust valve is opened to release the compressed gasses in the cylinder to the exhaust manifold. After the pressure has been released from the cylinder, the piston cannot recapture the potential energy stored in the compressed gases on the subsequent expansion down-stroke. Instead, the energy is dissipated through the exhaust and radiator systems of the engine. By dissipating the energy developed by compressing the cylinder charge, the engine develops retarding power to help slow the vehicle down.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke.

Compression release and/or bleeder type engine braking systems provide the operator with increased control over the vehicle. Properly designed and adjusted engine braking systems can generate retarding power equal in magnitude to a substantial portion of the power generated during positive power operations and may supplement the braking capacity of the primary vehicle wheel braking system. Accordingly, engine braking systems may substantially extend the life of the primary wheel braking system of the vehicle.

The principles of exhaust gas recirculation (EGR) are also well known. An EGR system allows a portion of the exhaust gases to flow back into the engine cylinder. Generally, there are two types of EGR systems, internal and external. External EGR systems recirculate gases from the exhaust port to the intake port through external means, such as, for example, external piping. Internal EGR systems recirculate exhaust gases back into the engine cylinder through an open engine valve(s).

EGR is useful during both positive power and engine braking operation. During positive power, EGR is primarily used to improve emissions by reducing the amount of $NO_x$ created by the engine. During engine positive power, one or more intake valves may be opened to admit fuel and air from the atmosphere, which contains the oxygen required to burn the fuel in the cylinder. The air, however, also contains a large quantity of nitrogen. The high temperature found within the engine cylinder causes the nitrogen to react with any unused oxygen and form nitrogen oxides (NOx). Nitrogen oxides are one of the main pollutants emitted by diesel engines. The recirculated gases provided by an EGR system have already been used by the engine and contain only a small amount of oxygen. By mixing these gases with fresh air, the amount of oxygen entering the engine may be reduced and fewer nitrogen oxides may be formed. In addition, the recirculated gases may have the effect of lowering the combustion temperature in the engine cylinder below the point at which nitrogen combines with oxygen to form NOx. As a result, EGR systems may work to reduce the amount of NOx produced and to improve engine emissions. Current environmental standards for diesel engines, as well as proposed regulations, in the United States and other countries indicate that the need for improved emissions will only become more important in the future.

It is therefore an advantage of some, but not necessarily all, embodiments of the present invention to provide improved emissions by reducing the amount of $NO_x$ created by the engine.

An EGR system can also be used to improve the effectiveness of engine braking. Recirculating gas during engine braking operation permits higher pressure gas from the exhaust manifold to recirculate back into the engine cylinder. The recirculated gas increases the total gas mass in the cylinder at the time of a subsequent engine braking event, thereby increasing the braking effect realized by the vehicle. By controlling the pressure and temperature in the exhaust manifold and engine cylinder during engine braking cycles, the level of braking may be optimized at various operating conditions. The use of EGR during engine braking may be referred to as braking gas recirculation, or BGR.

It is therefore an advantage of some, but not necessarily all, embodiments of the present invention to improve engine braking using gas recirculation and to provide different levels of engine braking and to optimize engine braking with engine speed.

EGR systems (valves, inter-coolers, passages, etc.) tend to become sooted over their life-cycle. Soot accumulation can reduce the overall performance of the system, and could cause failure of various system components. This condition may lead to decreased fuel economy, and even possible emissions compliance issues. The primary approach to this problem has been to institute regular maintenance and cleaning intervals, which may be undesirable to the longhaul heavy duty truck business. It is also problematic because of the physical difficulty involved with the cleaning of this system.

It is therefore an advantage of some, but not necessarily all, embodiments of the present invention to provide a method and apparatus for cleaning gas recirculation system components.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicants have developed an innovative gas recirculation system for improving engine braking in an internal combustion engine having an intake valve, an exhaust valve, and a cylinder. In one embodiment, the system comprises: an exhaust manifold operatively connected to the cylinder through the exhaust valve; an intake manifold operatively connected to the cylinder through the intake valve; and a gas recirculation passage adapted to recirculate gas from the exhaust manifold to the intake manifold during an engine braking event.

Applicants have further developed an innovative method of improving engine braking using gas recirculation in an internal combustion engine having an intake valve, an exhaust valve, an intake manifold, an exhaust manifold, and a cylinder. In one embodiment, the method comprises the steps of: providing a gas recirculation passage connecting the exhaust manifold to the intake manifold; and recirculating gas from the exhaust manifold to the intake manifold through the gas recirculation passage during an engine braking event to improve engine braking.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

DETAILED DESCRIPTION OF EMBODIMENTS OF THE INVENTION

Figure 1:
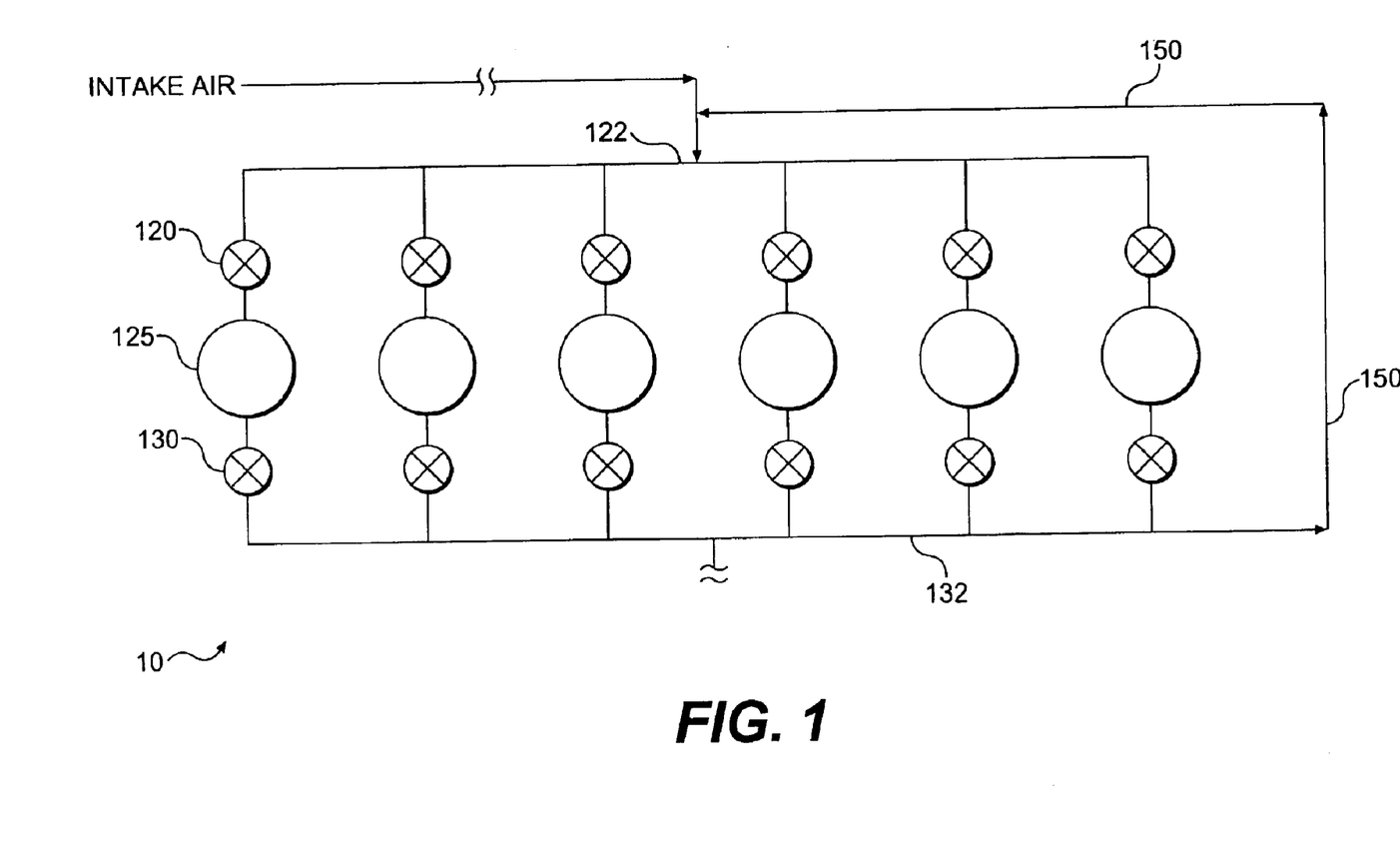
FIG. 1 is a schematic view illustrating a gas recirculation system according to an embodiment of the present invention.

Reference will now be made in detail to embodiments of the system and method of the present invention, examples of which are illustrated in the accompanying drawings. With reference to FIG. 1, an embodiment of the present invention is shown as gas recirculation system 10 in an internal combustion engine having an engine cylinder 125, one or more intake valves 120, and one or more exhaust valves 130. The system 10 includes an exhaust manifold 132 operatively connected to the cylinder 125 through the exhaust valve 130, and an intake manifold 122 operatively connected to the cylinder 125 through the intake valve 120. The exhaust manifold 132 may comprise a single manifold or a split-manifold.

The system 10 further includes a gas recirculation passage 150 connecting the exhaust side of the system 10 to the intake side of the system 10. In one embodiment, the gas recirculation passage 150 connects the exhaust manifold 132 to the intake manifold 122. It is appreciated, however, that the gas recirculation passage 150 may connect any point on the exhaust side of the system 10 to any point on the intake side of the system 10.

The gas recirculation passage 150 is adapted to recirculate gas from the exhaust manifold 132 to the intake manifold 122, and ultimately to the engine cylinder 125. The gas recirculation passage 150 may be adapted to recirculate the gas during engine braking operation, during system cleaning operation, and/or during positive power exhaust gas recirculation operation. The engine braking operation may include any one or more of the following: a compression release braking event, a full-cycle bleeder braking event, and/or a partial cycle bleeder braking event.

Figure 2:
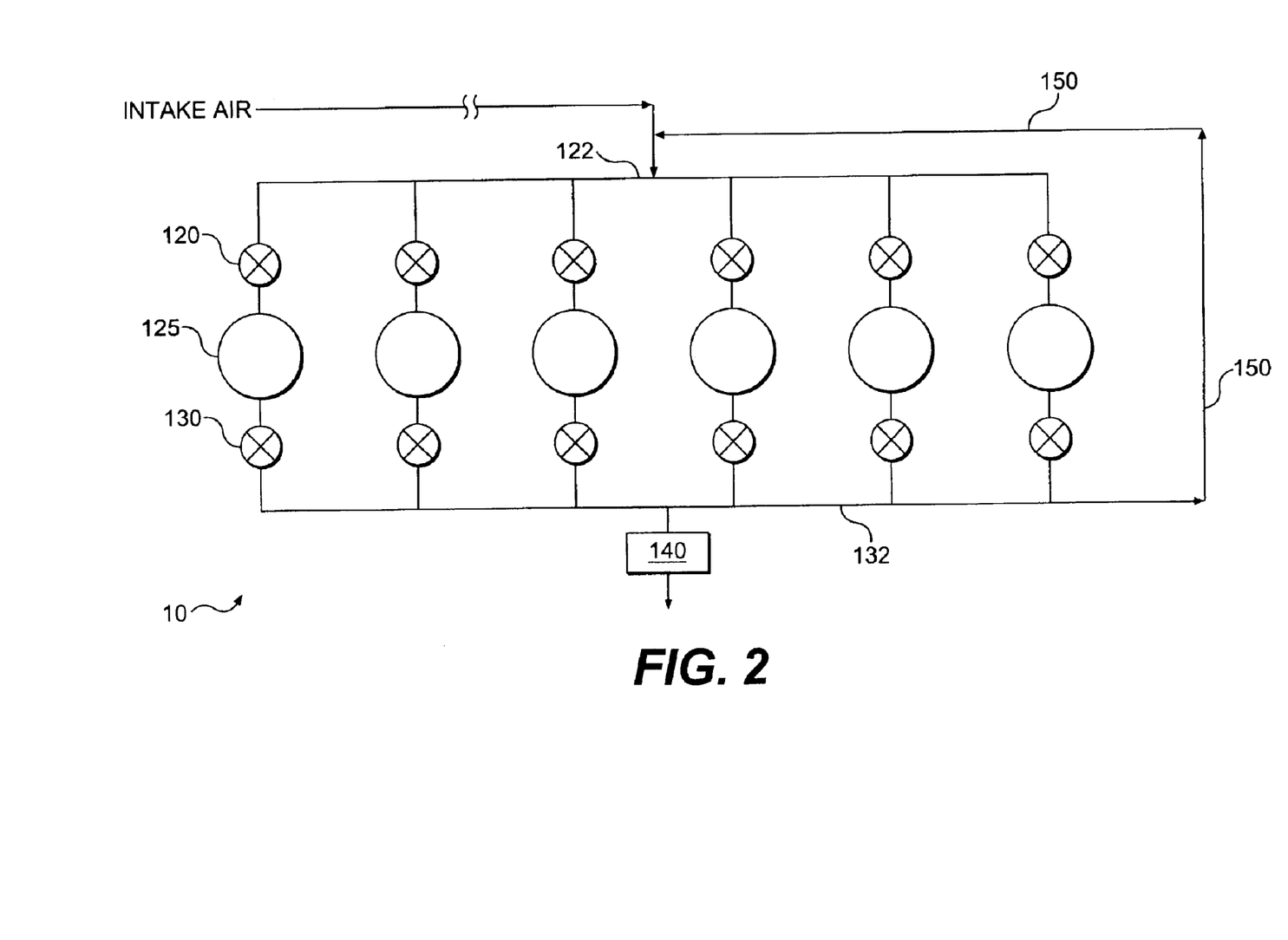
FIG. 2 is a schematic view illustrating a gas recirculation system according to a second embodiment of the present invention.
Figure 3:
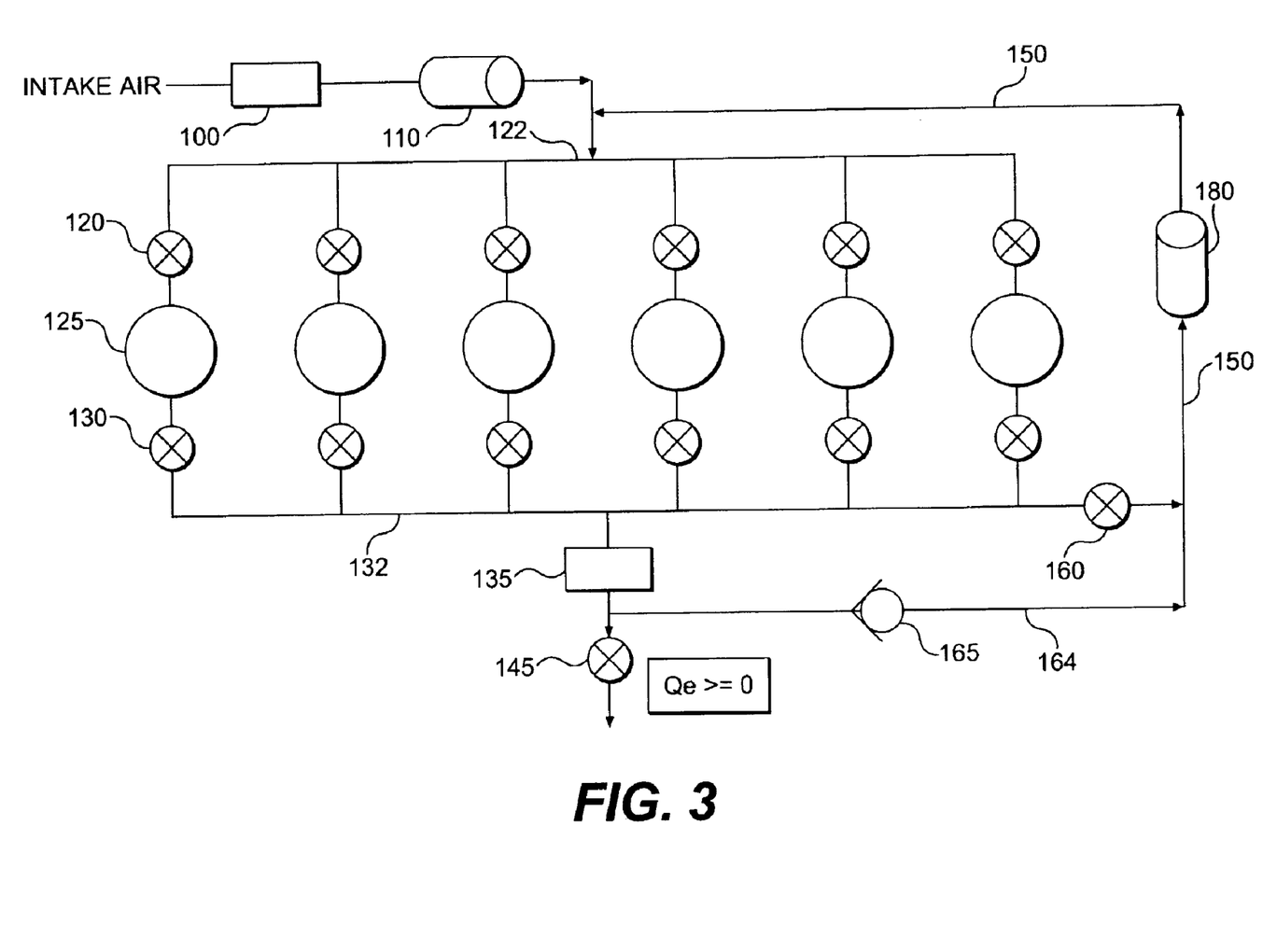
FIG. 3 is a schematic view illustrating a gas recirculation system according to a third embodiment of the present invention.
Figure 4:
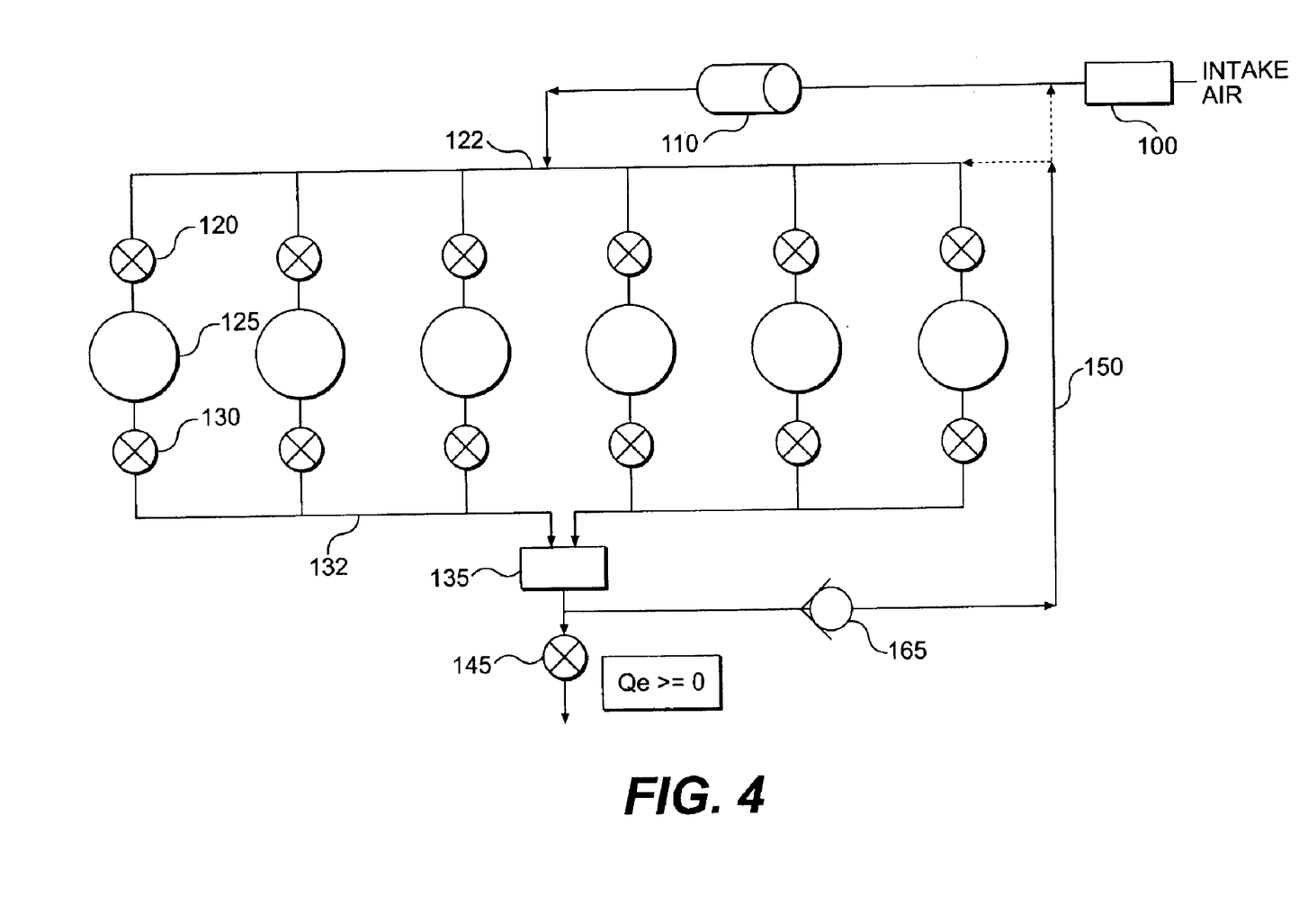
FIG. 4 is a schematic view illustrating a gas recirculation system according to a fourth embodiment of the present invention.

The gas recirculation system 10 may further comprise means 140 for controlling the flow of gas recirculated back to the engine cylinder 125, as shown in FIG. 2. The flow control means 140 is operatively connected to the exhaust manifold 132. In one embodiment, as shown in FIGS. 3 and 4, the flow control means 140 may comprise a turbocharger 135. The turbocharger includes a turbine 135 disposed in the exhaust manifold 132, and a compressor 100 disposed in the intake manifold 122. The pressure from normally wasted engine exhaust gases causes the turbine 135 to rotate. As the turbine 135 rotates, it drives the compressor 100 which is coupled to the turbine 135. The rotating compressor 100 creates a high volume of air at increased pressure (turbo boost pressure), which may develop increased power during combustion, and accordingly, increased braking effect during the engine braking event.

In one embodiment, the turbocharger 135 is a variable geometry turbocharger (VGT). A VGT has movable components (geometry) that can change the area of the turbocharger through which engine exhaust gases flow. In one embodiment, the geometry of the turbocharger 135 is varied by changing the vane position, which generates a different air flow passage (or resistance) through which the exhaust gases flow. There are several known embodiments for a variable geometry turbocharger, such as, for example, the swing-vane type and the sliding-vane type, and it is contemplated that the present invention could use any of these and/or new VGTs developed by the Assignee or others. Other embodiments of the turbocharger 135, including, but not limited to, a fixed geometry turbocharger (FGT), a wastegated turbocharger, and/or any system or device which could control the flow area and/or direction of the exhaust gases, are considered well within the scope of the present invention.

As shown in FIGS. 3 and 4, the flow control means 140 may further comprise a flow control device 145, such as, for example, an exhaust brake. The flow control device 145 is adapted to selectively restrict the flow of gas recirculated back to the engine cylinder 125. The flow control device 145 may be located downstream of the turbocharger 135. The flow control device 145 may be operative between a full range of positions, from a fully open position to a fully closed position. It is contemplated that the flow control device 145 may be provided with or without the turbocharger 135.

With continued reference to FIG. 3, the gas recirculation system 10 may further comprise a gas recirculation valve 160 disposed in the gas recirculation passage 150. It is contemplated that, in other embodiments of the present invention, the gas recirculation valve 160 may be disposed in the exhaust manifold 132, provided that the valve 160 is adapted to control the flow of gas into the gas recirculation passage 150.

The gas recirculation valve 160 may be selectively opened during an engine braking event such that gas generated during the engine braking event is released into the gas recirculation passage 150. Alternatively, the gas recirculation valve 160 may remain fully closed (or is not included in the embodiment of the invention), and the gas generated during the engine braking event is directed into the flow control means 140. In this manner, the gas recirculation system 10 may also provide an internal gas recirculation event. The gas recirculation valve 160 may be operative between a range of positions, from a fully open position to a fully closed position.

With continued reference to FIG. 3, the gas recirculation system 10 may further comprise a bypass line 164. The bypass line 164 preferably connects a point downstream of the turbocharger 135 to the gas recirculation passage 150 downstream of the gas recirculation valve 160. A check valve 165 may be disposed in the bypass line 164 to prevent the flow of gas back through the bypass line 164. After gas generated during the engine braking event is directed through the turbocharger 135, the gas may be recirculated from the bypass line 164 to the intake manifold 122, and ultimately back into the engine cylinder 125, through the gas recirculation passage 150. The bypass line 164 permits gas to flow past the turbine 135, which in turn, drives the compressor 100 and generates a higher boost pressure for a better engine braking effect. In an embodiment of the present invention including both a turbocharger 135 and a flow control device 145, the bypass line 164 may prevent the flow restriction provided by the flow control device 145 from stalling the turbine 135 and eliminating any intake boost.

The gas recirculation system 10 may further comprise means 180 for cooling the recirculated gas, as shown in FIG. 3. The cooling means 180 is preferably disposed in the gas recirculation passage 150. It is appreciated that a by-pass may be provided such that the recirculated gas is not cooled by the cooling means 180. After passing through, or by-passing, the cooling means 180, the gas is directed through the intake manifold 122 and is introduced into the engine cylinder 125, whereby the air charge in the cylinder may be increased.

The gas recirculation system 10 may further comprise an inter-cooler 110, as shown in FIGS. 3 and 4. The inter-cooler 110 may be used to cool intake air compressed by the compressor 100 and to provide a cool intake boost. The system 10 is adapted to provide hot and/or cooled gas recirculation. Gas recirculated through the gas recirculation passage 150 may be directed upstream of the inter-cooler 110 or downstream of the inter-cooler 110, as shown in FIG. 4. In an embodiment of the present invention where the cooling means 180 is by-passed or not provided, the inter-cooler 110 may cool both the intake air and the recirculated gas.

The gas recirculation system 10 may further comprise an engine control means (ECM) (not shown) for controlling the various components of the gas recirculation system 10 such that the desired level of engine braking, system cleaning, and/or EGR is achieved. The ECM may control, for example, the turbocharger 135, the flow control device 145, the gas recirculation valve 160, and/or the check valve 165. The ECM may include a computer and may be connected to sensors through any connection means, such as electrical wiring or gas passageways, to the turbocharger 135, the flow control device 145, the gas recirculation valve 160, the check valve 165, the engine cylinder 125, the intake manifold 122, the exhaust manifold 132, and/or any other part of the engine system. The ECM may also be connected to an appropriate engine component, such as a tachometer, capable of providing the ECM with a measurement of engine speed and/or other engine parameters.

Figure 5:
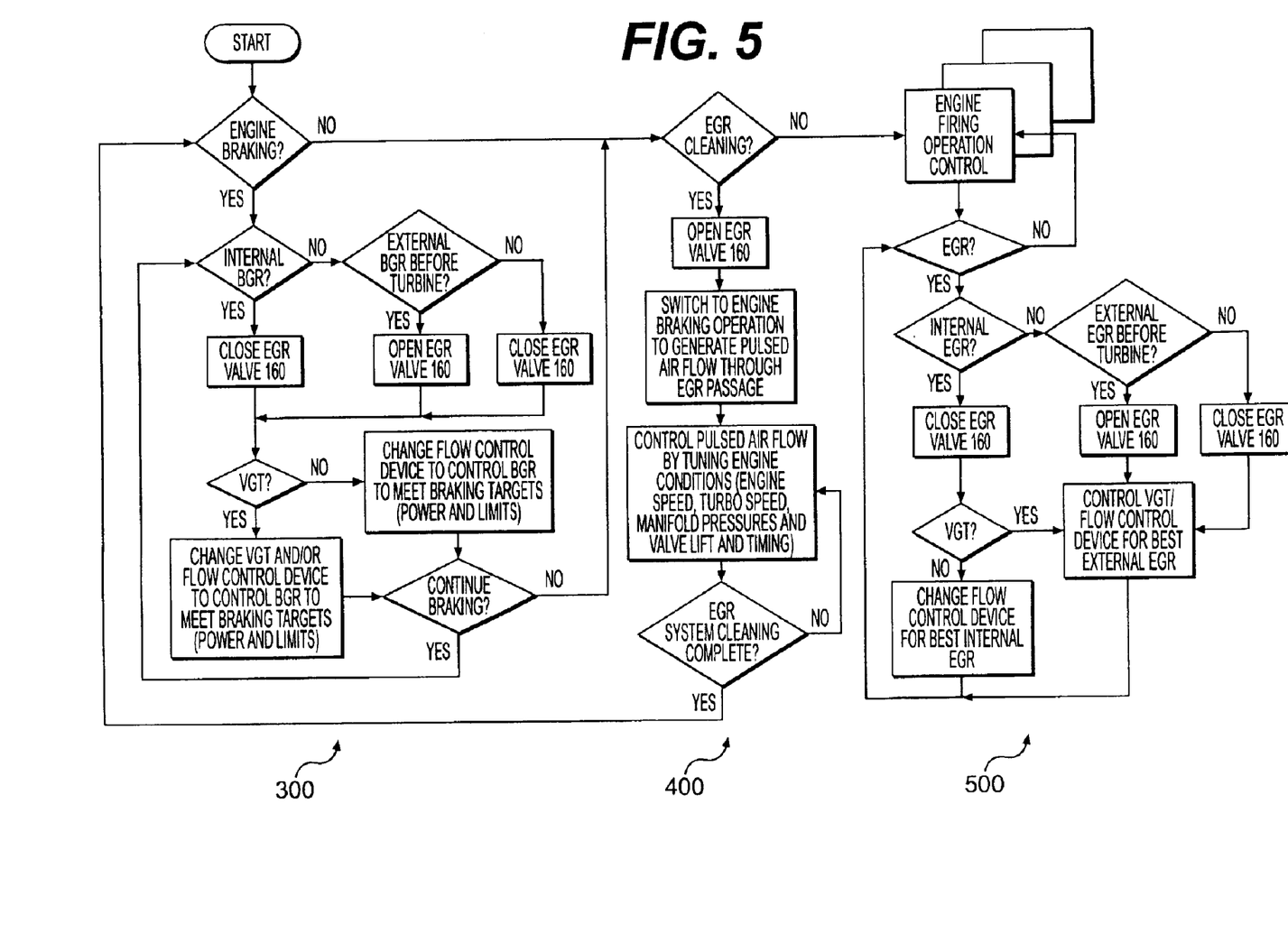
FIG. 5 is a block diagram illustrating a method for recirculating gas according an embodiment of the present invention.
Figure 6:
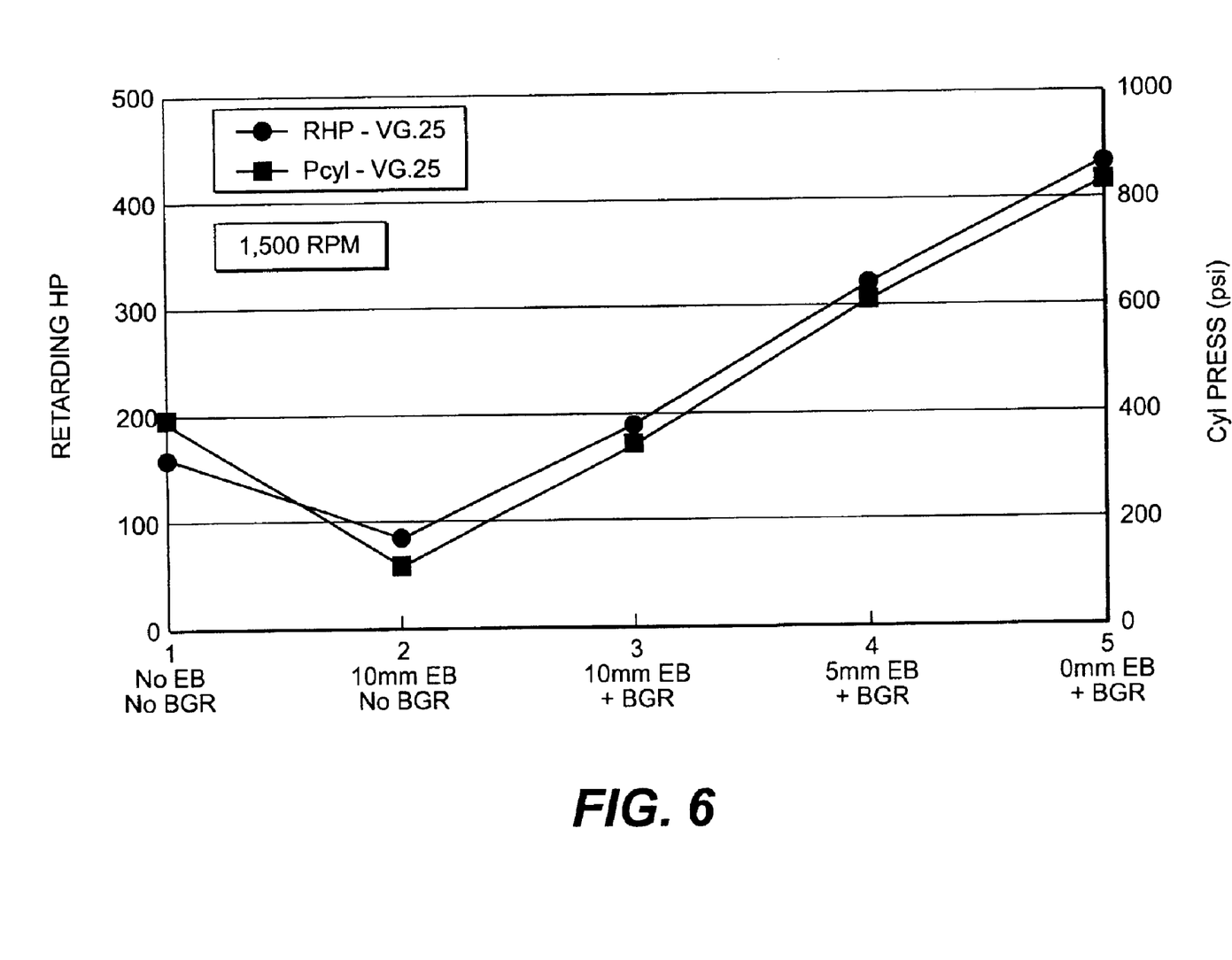
FIG. 6 is a graph illustrating retarding horsepower and cylinder pressure with and without Braking Gas Recirculation ("BGR") according to an embodiment of the present invention.
Figure 7:
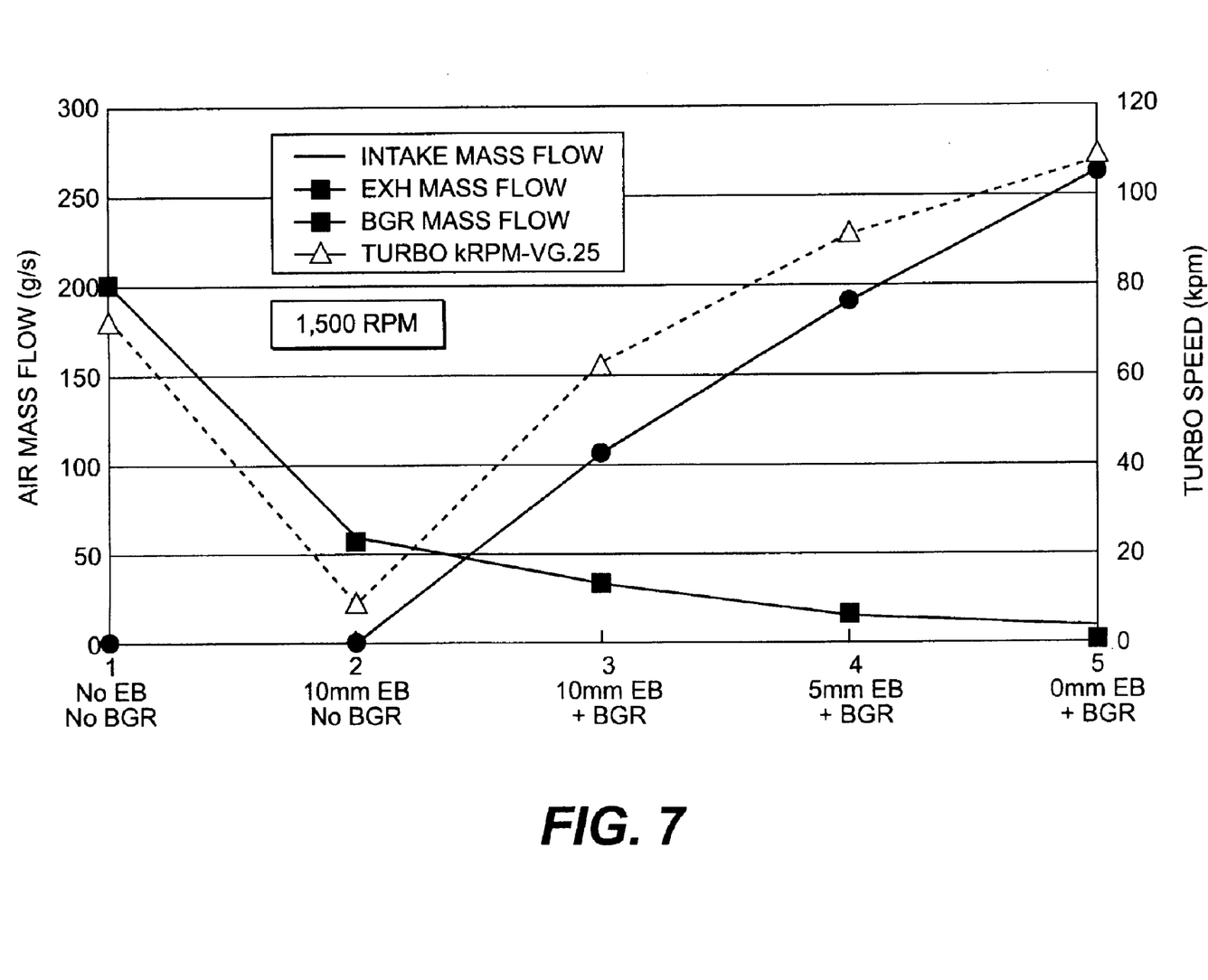
FIG. 7 is a graph illustrating air mass flow and turbo speed with and without BGR according to an embodiment of the present invention.
Figure 8:
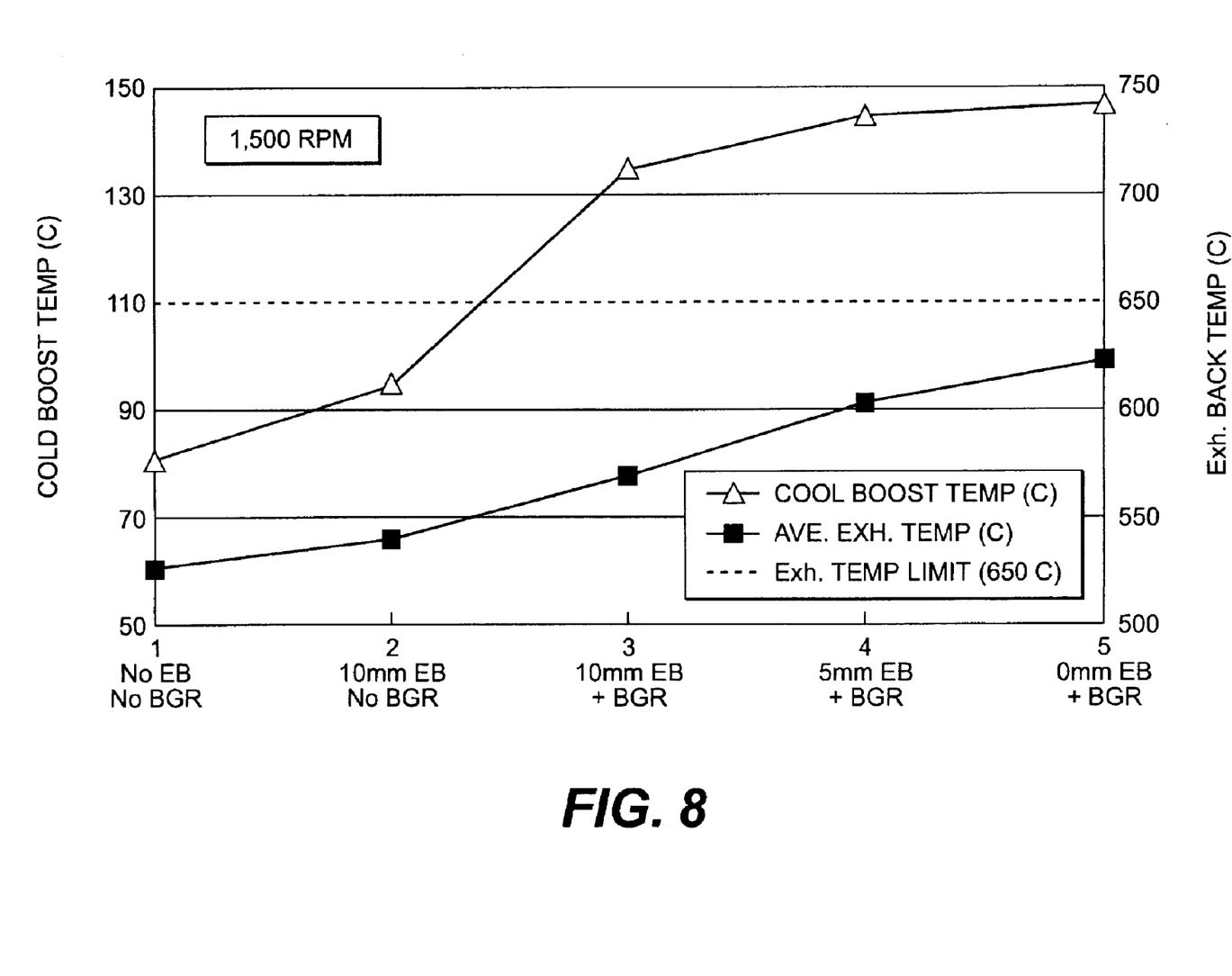
FIG. 8 is a graph illustrating cold boost temperature and exhaust back temperature with and without BGR according to an embodiment of the present invention.
Figure 9:
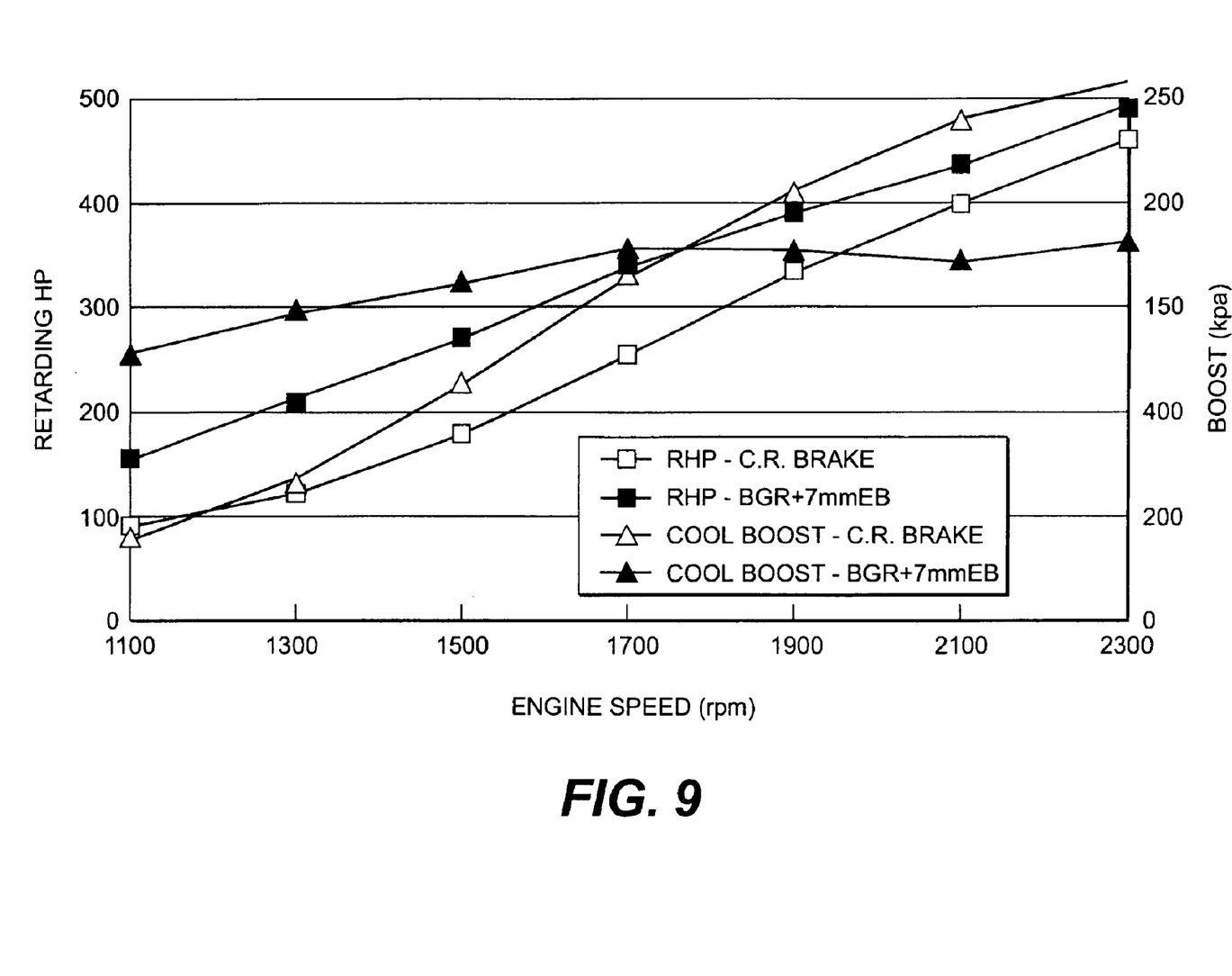
FIG. 9 is a graph illustrating retarding horsepower and boost at varying engine speeds with and without BGR according to an embodiment of the present invention.
Figure 10:
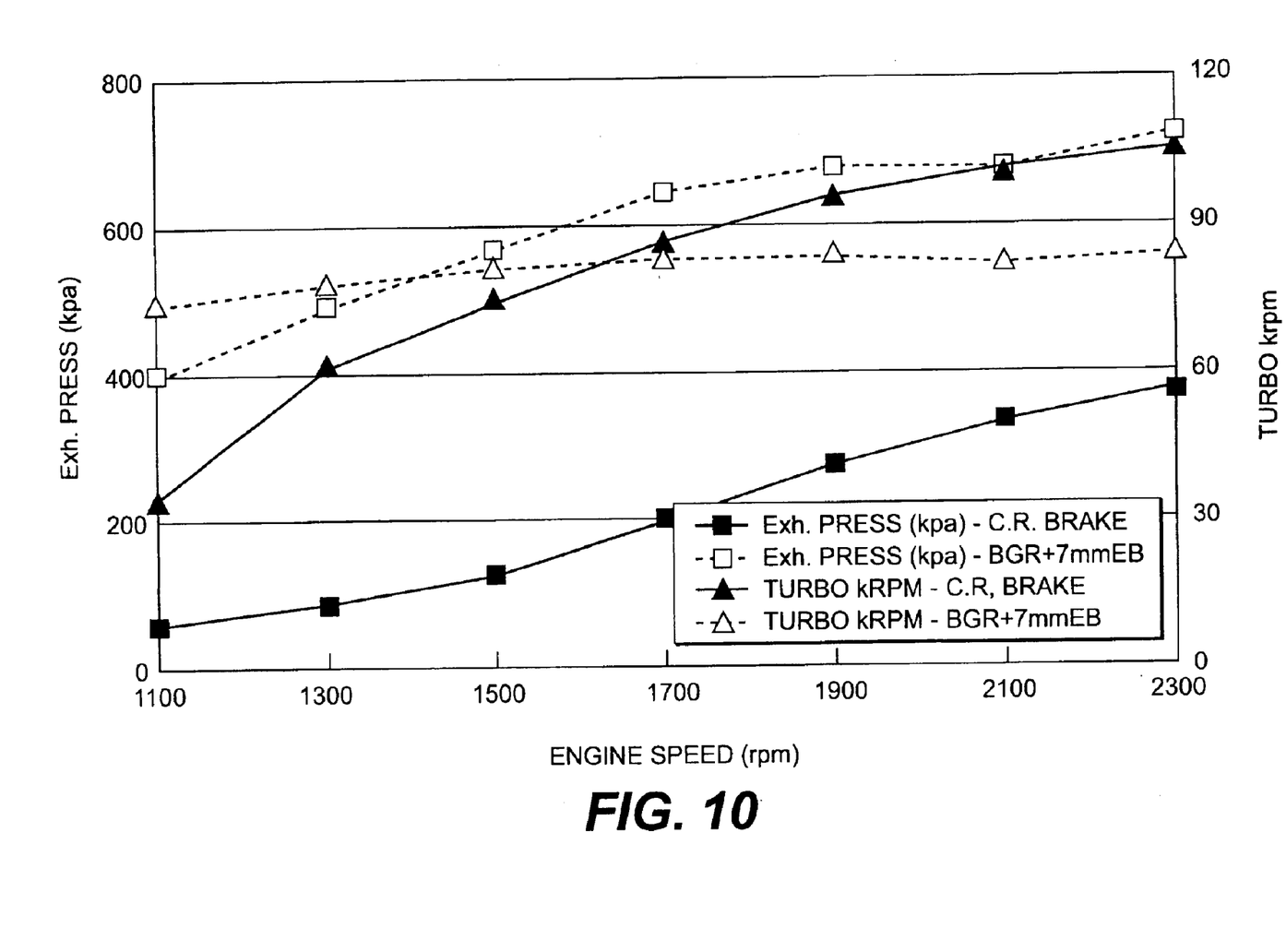
FIG. 10 is a graph illustrating exhaust pressure and turbo speed at varying engine speeds with and without BGR according to an embodiment of the present invention.

Operation of the gas recirculation system 10 of the present invention will now be described with reference to FIG. 5. FIG. 5 is a block diagram illustrating a method for recirculating gas in an internal combustion engine. The gas recirculation system 10 may provide gas recirculation during engine braking operation 300, during cleaning operation 400, and/or during positive power exhaust gas recirculation operation 500.

As shown in FIG. 5, the gas recirculation system 10 may provide gas recirculation during engine braking operation 300. The gas recirculation system 10 may provide internal and/or external gas recirculation during engine braking operation 300. If internal BGR is required, the gas recirculation valve 160 may be closed to direct the gas into the engine cylinder 125 through an open engine exhaust valve 130. The exhaust valve 130 may have, for example, an EGR/BGR or bleeder-type valve lift. The flow control means 140 controls the flow of the gas recirculated back into the engine cylinder 125. In an embodiment of the present invention having both a flow control device 145 and a VGT turbocharger 135, these devices may then be adjusted such that braking parameters, such as, for example, braking power, limits on braking load, exhaust pressure, exhaust temperature, and turbo speed, meet or do not exceed desired levels. In an embodiment of the present invention including only a flow control device 145, the flow control device 145 may be adjusted.

Alternatively, if external BGR is desired, the gas recirculation valve 160 may be selectively opened during the engine braking event such that the gas is directed into the gas recirculation passage 150. In an embodiment of the present invention where external BGR before the turbine 135 is not desired, such as, for example, where the bypass line 164 is provided, the gas recirculation valve 160 may be selectively closed during the braking event such that after the gas is directed through the turbocharger 135, the gas may be recirculated from the bypass line 164 to the intake manifold 122, and ultimately back into the engine cylinder 125, through the gas recirculation passage 150. In an embodiment of the present invention that includes both a VGT turbocharger 135 and a flow control device 145, the turbocharger 135 and/or the flow control device 145 may then be adjusted such that system parameters, such as, for example, braking power, limits on braking load, exhaust pressure, exhaust temperature, and turbo speed, meet or do not exceed desired levels. In an embodiment of the present invention including only a flow control device 145, the flow control device 145 may be adjusted.

FIGS. 6–10 illustrate various system parameters with and without BGR according to embodiments of the present invention. It is to be understood that FIGS. 6–10 are for exemplary purposes only, and the actual values represented may vary.

The gas recirculation system 10 may provide gas recirculation during cleaning operation 400. The components of the gas recirculation system 10 may become sooted during normal engine EGR operation, which may cause the components to bind or stick. The gas from an engine braking event may be introduced into the gas recirculation system 10 and may aid in cleaning the various system components.

Cleaning operation 400 may be activated: (1) at a predetermined time cycle; (2) based on a soot level indicator activating the system; (3) based on an engine light recommending cleaning "soon"; and/or (4) manually by the operator from the cab, possibly based on an indicator light or a recommended cleaning cycle. After the cleaning operation has been activated, the gas recirculation valve 160 is opened. In one embodiment, the gas recirculation valve 160 is opened to a fully open position. The system is switched to engine braking operation to generate pulsed air flow through the gas recirculation passage 150. The pulsed air flow may be controlled to optimize the cleaning operation by tuning one or more engine conditions, such as, for example, engine speed, turbo speed, manifold pressures, and valve lift and timing. The cleaning function may eliminate one of the largest concerns for longevity and durability of the gas recirculation system 10.

The gas recirculation system 10 may provide gas recirculation during normal internal and/or external exhaust gas recirculation operation 500. When internal exhaust gas recirculation is required, the gas recirculation valve 160 may be selectively closed, as shown in FIG. 5. In one embodiment, the gas recirculation valve 160 is closed to a fully closed position. The flow control means 140 is then controlled for optimal internal EGR operation based on engine operating conditions, such as, for example, engine speed and fuel (load). When external EGR operation before the turbine 135 is desired, the gas recirculation valve 160 may be opened and the turbocharger 135 and the flow control device 145 may be controlled for optimal external EGR operation. In an embodiment of the system 10 where there is no turbocharger 135, or external EGR before the turbine is not desired, the gas recirculation valve 160 may be closed and the flow control device 145 (and turbocharger 135, if present) may be controlled for optimal external EGR operation.

Whether internal or external exhaust gas recirculation is provided during the engine braking process 300 and/or during positive power exhaust gas recirculation operation 500 depends on a variety of factors, such as, for example, EGR requirements, engine operating conditions (e.g., engine speed), and system specifications (e.g., whether a dedicated EGR cam lobe is provided). It is contemplated that embodiments of the present invention may provide a combination of internal and external gas recirculation during engine braking 300 and/or during positive power exhaust gas recirculation operation 500.

It will be apparent to those skilled in the art that variations and modifications of the present invention can be made without departing from the scope or spirit of the invention.

What is claimed is:

1. A gas recirculation system for improving engine braking in an internal combustion engine having an intake valve, an exhaust valve, and a cylinder, said gas recirculation system comprising:

an exhaust manifold operatively connected to the cylinder through the exhaust valve;

an intake manifold operatively connected to the cylinder through the intake valve; and a gas recirculation passage adapted to recirculate gas from said exhaust manifold to said intake manifold during an engine braking event.

2. The system of claim 1, further comprising means for controlling the flow of recirculated gas to the engine cylinder, said flow control means operatively connected to said exhaust manifold.

3. The system of claim 2, wherein said flow control means comprises a turbocharger.

4. The system of claim 2, wherein said turbocharger is selected from the group consisting of: a variable geometry turbocharger, a wastegated turbocharger, and a fixed geometry turbocharger.

5. The system of claim 3, wherein said flow control means further comprises a flow control device located downstream of said turbocharger.

6. The system of claim 5, wherein said flow control device is an exhaust brake operative between a fully open position and a fully closed position.

7. The system of claim 2, further comprising a gas recirculation valve disposed in said gas recirculation passage.

8. The system of claim 7, said gas recirculation valve operative between a fully open position and a fully closed position.

9. The system of claim 7, said valve having a first position for selectively recirculating gas from said exhaust manifold to said intake manifold through said gas recirculation passage during the engine braking event, and a second position for directing gas through said flow control means.

10. A method of improving engine braking using gas recirculation in an internal combustion engine having an intake valve, an exhaust valve, an intake manifold, an exhaust manifold, and a cylinder, said method comprising the steps of:

providing a gas recirculation passage connecting the exhaust manifold to the intake manifold; and recirculating gas from the exhaust manifold to the intake manifold through the gas recirculation passage during an engine braking event.

11. The method of claim 10, further comprising the steps of:

providing a valve disposed in the gas recirculation passage; and selectively operating the valve during the engine braking event.

12. The method of claim 11, wherein the step of operating the valve comprises the step of opening the valve during the engine braking event.

13. The method of claim 12, further comprising the step of providing an external gas recirculation event.

14. The method of claim 11, wherein the step of operating the valve comprises the step of closing the valve during the engine braking event.

15. The method of claim 14, further comprising the step of providing an internal gas recirculation event.

16. The method of claim 10, further comprising the step of using the recirculated gas to clean the intake manifold.

17. A method of improving operation of an internal combustion engine based on at least one engine operating parameter, said method comprising the steps of:

measuring the engine operating parameter;

providing gas recirculation during at least two engine processes selected from the group consisting of: engine braking operation, cleaning operation, and positive power exhaust gas recirculation operation; and controlling the flow of the recirculated gas based on the value of the engine operating parameter.

18. A gas recirculation system for improving engine braking in an internal combustion engine having an intake valve, an exhaust valve, and a cylinder, said gas recirculation system comprising:

an exhaust manifold operatively connected to the cylinder through the exhaust valve;

an intake manifold operatively connected to the cylinder through the intake valve;

a gas recirculation passage adapted to recirculate gas from said exhaust manifold to said intake manifold during an engine braking event;

a turbocharger operatively connected to said exhaust manifold; and a flow control device located downstream of said turbocharger.

19. The system of claim 18, wherein said turbocharger is selected from the group consisting of: a variable geometry turbocharger, a wastegated turbocharger, and a fixed geometry turbocharger.

20. The system of claim 18, wherein said flow control device comprises an exhaust brake operative between a fully open position and a fully closed position.

21. The system of claim 18, further comprising a gas recirculation valve disposed in said gas recirculation passage.

22. The system of claim 21, said gas recirculation valve operative between a fully open position and a fully closed position.

23. The system of claim 21, said gas recirculation valve having a first position for selectively recirculating gas from said exhaust manifold to said intake manifold through said gas recirculation passage during the engine braking event, and a second position for directing gas through said turbocharger.

* * * * *